United States Patent [19]

Young et al.

[11] Patent Number: 4,513,333

[45] Date of Patent: Apr. 23, 1985

[54] DIAGNOSTIC RECORDING

[75] Inventors: Ronald E. Young, Los Gatos; Duane C. Meulners, San Jose, both of Calif.

[73] Assignee: Dymek Corporation, San Jose, Calif.

[21] Appl. No.: 585,829

[22] Filed: Mar. 2, 1984

Related U.S. Application Data

[63] Continuation of Ser. No. 351,934, Feb. 24, 1982, abandoned.

[51] Int. Cl.³ .......................... G11B 5/00; G11B 5/46; G11B 5/58; G11B 23/34
[52] U.S. Cl. ........................................ 360/77; 360/31; 360/135
[58] Field of Search ............... 360/131, 134, 135, 136, 360/25, 31, 75, 76, 77, 78

[56] References Cited

U.S. PATENT DOCUMENTS

| | | | |
|---|---|---|---|
| 2,709,204 | 5/1955 | Holmes | 360/73 X |
| 3,124,662 | 3/1964 | Ryder | 360/73 |
| 3,263,031 | 7/1966 | Welsh | 360/106 X |
| 3,508,231 | 4/1970 | Levin | 360/134 |
| 3,593,331 | 7/1971 | Connell et al. | 340/174.1 C |
| 3,852,815 | 12/1974 | Ljudmirsky et al. | 360/75 |
| 3,855,622 | 12/1974 | Truscelli et al. | 360/103 |
| 3,924,268 | 12/1975 | McIntosh et al. | 360/78 |
| 3,947,875 | 3/1976 | Bull et al. | 360/39 |
| 4,012,791 | 3/1977 | Bleiman | 360/99 |
| 4,068,267 | 1/1978 | Inouye | 360/75 |
| 4,084,201 | 4/1978 | Hack et al. | 360/135 |
| 4,122,503 | 10/1978 | Allan | 360/78 |
| 4,149,200 | 4/1979 | Card | 360/77 |
| 4,157,576 | 6/1979 | Hack et al. | 360/77 |
| 4,190,859 | 2/1980 | Kinjo | 358/128.5 |
| 4,213,148 | 7/1980 | Clemens | 358/128.6 |
| 4,223,187 | 9/1980 | Yonezawa et al. | 179/100.1 G |
| 4,458,275 | 7/1984 | Monti | 360/78 |

FOREIGN PATENT DOCUMENTS

| | | | |
|---|---|---|---|
| 3231248 | 3/1983 | Fed. Rep. of Germany | 360/77 |
| 52-71212 | 6/1977 | Japan | 360/77 |
| 55-77032 | 6/1980 | Japan | 360/77 |
| 56-68940 | 6/1981 | Japan | 360/131 |
| 57-18020 | 1/1982 | Japan | 360/75 |
| 58-68222 | 4/1983 | Japan | 360/77 |
| 1395471 | 5/1975 | United Kingdom | 360/131 |
| 463141 | 5/1975 | U.S.S.R. | 360/75 |
| 494765 | 12/1975 | U.S.S.R. | 360/134 |
| 583471 | 12/1977 | U.S.S.R. | 360/134 |

OTHER PUBLICATIONS

*Communications*, vol. 25, No. 12, Dec. 1977, pp. 1041–1044, "A Uniform Track-Positioning and Dimensioning System for Magnetic Recording", E. R. Hanson.

IBM Technical Disclosure Bulletin, vol. 23, No. 3, Aug. 1980, Improvement in the Position Error Signal Detector Channel for a "Buried Servo" Recording System, pp. 1203–1210, Handen et al.

*IBM Technical Disclosure Bulletin*, vol. 17, No. 5, Oct. 1974, Accessing Technique for Magnetic Disks, J. Elliott, pp. 1464–1465.

*Primary Examiner*—George G. Stellar
*Attorney, Agent, or Firm*—Gerald L. Moore

[57] ABSTRACT

A diagnostic recording, readable by a computer system for enabling a user without special knowledge, software, or equipment to check, isolate and identify hardware malfunctions within the system, has a track with magnetic signals recorded thereon that is centered within a normal track space. A pair of void spaces of equal width remain within the normal track space on opposite sides of the track and extend parallel thereto. The track and the adjacent void spaces have special widths for diagnostic purposes.

28 Claims, 9 Drawing Figures

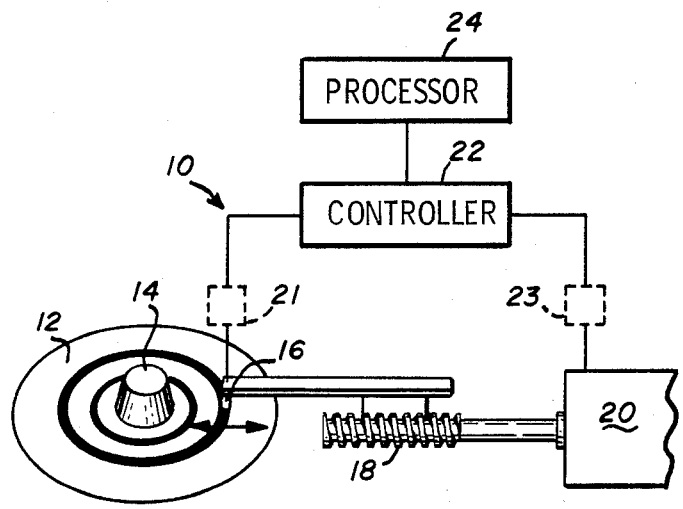
Fig_1
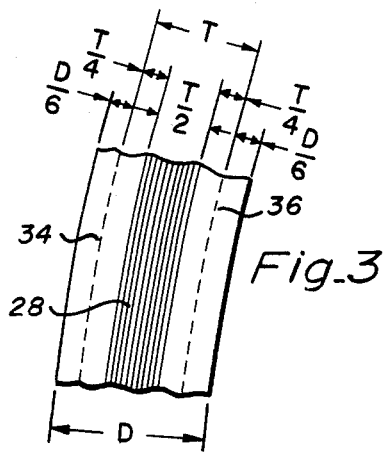
Fig_3
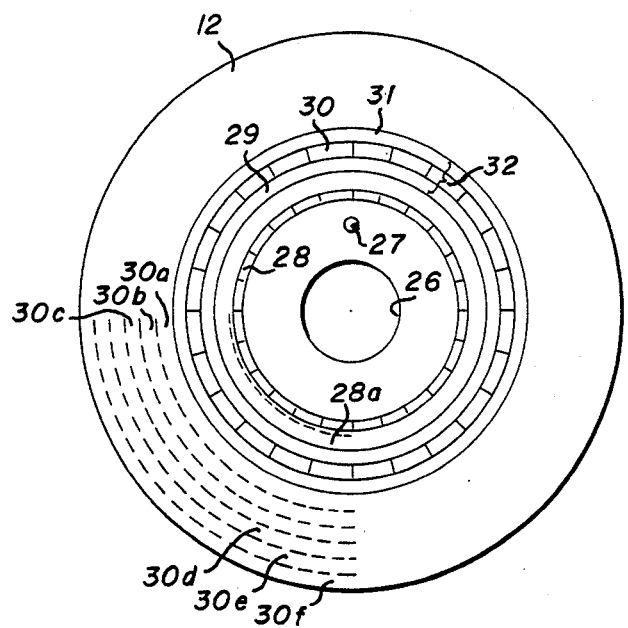
Fig_2
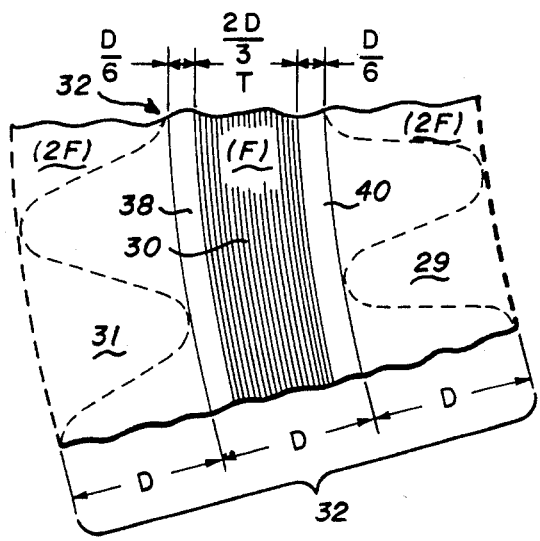
Fig_4

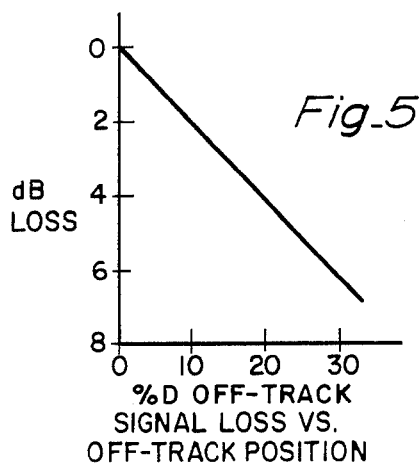
Fig. 5 SIGNAL LOSS VS. OFF-TRACK POSITION
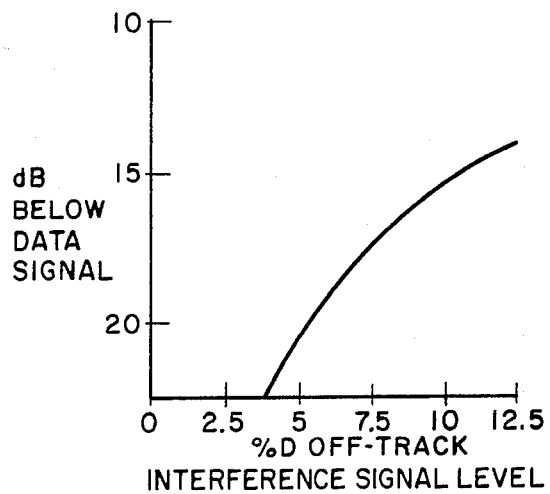
Fig. 6 INTERFERENCE SIGNAL LEVEL
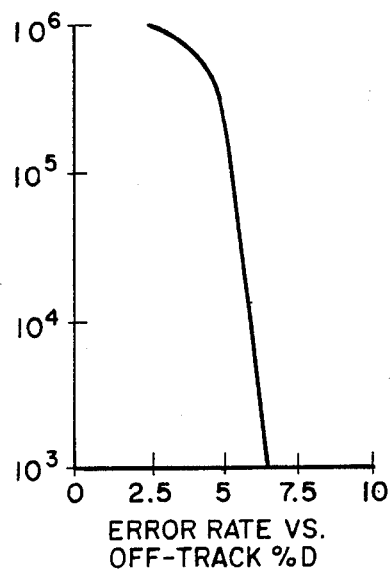
Fig. 7 ERROR RATE VS. OFF-TRACK %D
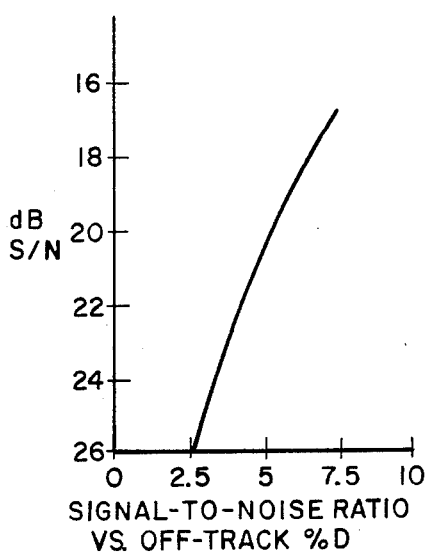
Fig. 8 SIGNAL-TO-NOISE RATIO VS. OFF-TRACK %D

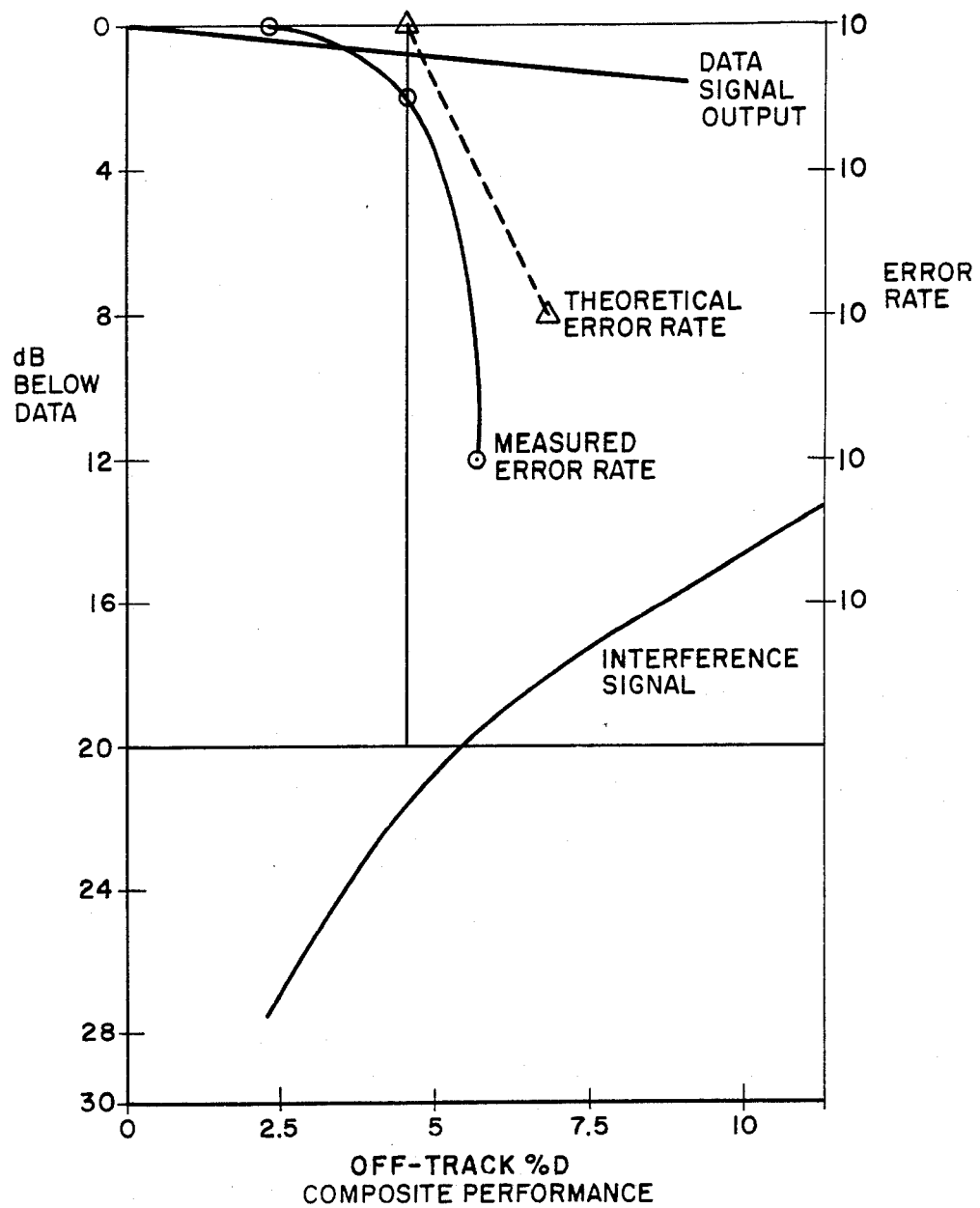
Fig_9

DIAGNOSTIC RECORDING

This is a continuation of application Ser. No. 06/351,934, filed Feb. 24, 1982 now abandoned.

BACKGROUND OF THE INVENTION

1. Field of the Invention

This invention relates generally to a diagnostic recording and more specifically, it concerns such a recording that is readable by a computer system for enabling a user without special knowledge, software, or equipment to check, isolate and identify certain hardware malfunctions within the system.

2. Description of the Prior Art

When using a computer system and a failure to properly read a specific piece of data occurs, several questions are raised. One question is whether or not the signal-to-noise quality of the system is satisfactory. Another question is whether or not the read head is in proper alignment. To answer these questions, skilled service has been required. To determine disk drive alignment, current practice requires removal of the drive from the disk system by a skilled serviceman, who connects the drive to an exerciser, inserts an alignment disk, and with an oscilloscope interprets the pattern to determine if the drive alignment is satisfactory for the purpose intended. This requires several hours of down time for the system and the services of a skilled technician with proper equipment.

Disks for aligning disk drives with an oscilloscope are well known. A flexible magnetic disk with signals varying on either side of a track centerline is disclosed in U.S. Pat. No. 4,084,201 to Hack, et al. These signals are read and interpreted with the aid of an oscilloscope to check and make track adjustment, ascertain disk eccentricity and spindle eccentricity, check functioning of a magnetic head, and adjust the azimuth angle of the head. U.S. Pat. No. 3,593,331 to Connell, et al., discloses an alignment disk with a three-track arrangement that provides a group of signals which may be read with a plurality of read/write heads and interpreted with the aid of an oscilloscope to produce an electrical function representative of disk alignment.

Automatic control systems for maintaining alignment of transducers are disclosed in U.S. Pat. No. 4,068,267 to Inouye; U.S. Pat. No. 4,149,200 to Card; U.S. Pat. No. 4,157,576 to Hack; U.S. Pat. No. 4,190,859 to Kinjo; and U.S. Pat. No. 4,213,148 to Clemens. U.S. Pat. No. 4,223,187 to Yonezawa, et al., discloses obtaining an alignment signal by analyzing signal variations caused by known undulations in the recording track.

Attempts have been made to write a disk in machine-readable code in an off-track manner. These attempts were based on an assumption that if the drive in question could read a track offset in either direction from a correct track centerline position by one-half track width, the head alignment must be satisfactory. This assumption is erroneous. A signal degrades but 50 percent of the signal level for a one-half track width offset condition, and most disk drives will produce error-free signals well beyond this offset because the 50 percent signal level due to off-track conditions is basic to design in this type of device. Thus, such disks with off-track data will be read with failure points determined only by indeterminate system noise.

SUMMARY OF THE PRESENT INVENTION

An object of the present invention is to provide a means for diagnosing potential head alignment error and head playback quality by direct operation of a computer system.

Another object of the invention is to provide a recording that can be used to determine if reading faults are due to interchange track alignment error.

A further object of the invention is to provide a recording that can be read by a computer system for enabling a user without special knowledge, software, or equipment to check, isolate and identify hardware malfunctions within the system so that correct maintenance action can be initiated.

In accordance with the present invention, there is provided a diagnostic recording having a normal track space. A track is centered within the normal track space and has data in the form of magnetic signals recorded thereon. A pair of adjacent spaces of equal width remain within the normal track space and extend parallel to the track on opposite sides thereof. The track and the adjacent spaces have special widths for diagnostic purposes.

In a preferred embodiment, the track width is a known fraction of a normal track width and the magnetic signal output of the track is reduced proportionally. This track can be used for checking signal-to-noise quality of the system by direct computer operations. In another location a recording has a test track for checking head alignment by direct computer operation. This track location includes a normal width track centered within a normal track space, a pair of adjacent void spaces having widths equal to a common accepted value for design tolerance within the system for off-track error, and a pair of adjacent tracks with magnetic interference signals recorded thereon that are located parallel to the data tracks void spaces on the sides away from the data track.

A diagnostic recording in accordance with the present invention has the advantages of being applicable to a wide range of track densities, to all known formats, and to varous recording media such as disks, diskettes, tapes, cassettes and drums.

These and other objects and advantages of the present invention will no doubt become obvious to those of ordinary skill in the art after having read the following detailed description of the preferred embodiment which is illustrated in the various drawing figures.

IN THE DRAWING

FIG. 1 is a diagrammatic view of a computer system having therein a diagnostic recording in accordance with the present invention;

FIG. 2 is an enlarged plan view of the diagnostic recording shown in FIG. 1;

FIG. 3 is an enlarged plan view of the diagnostic recording shown in FIG. 2;

FIG. 4 is a detail view of a test band shown in FIG. 2;

FIG. 5 is a graph illustrating the relationship of signal loss to off-track position;

FIG. 6 is a graph illustrating the relationship of interference signal level to off-track position;

FIG. 7 is a graph illustrating the relationship of error rate to off-track position;

FIG. 8 is a graph illustrating the relationship of signal-to-noise ratio to off-track position; and FIG. 9 is a graph illustrating composite performance which results in the relationship of a measured error rate to off-track position.

DETAILED DESCRIPTION OF THE PREFERRED EMBODIMENTS

FIG. 1 illustrates a computer system, identified by general reference number 10, having inserted therein a diagnostic recording 12. The recording 12 is readable by the system 10 and enables a user without special knowledge, software, or equipment to check, isolate and identify hardware malfunctions within the system. For purposes of illustration, the computer system 10 is shown as a typical disk system, and the recording 12 is represented in the form of a diskette. The recording 12 is mounted for rotation on a spindle/hub 14. A read/write head 16 typically is movable radially on the recording by a mechanism such as a lead screw 18 that is turned by a stepping motor 20. The read/write head 16 is connected through an interface circuit 21 to a controller 22. The controller 22 is connected to the stepping motor 20 through an interface circuit 23. The controller 22 is also connected to a processor 24.

FIG. 2 shows the basic configuration of the recording 12. A hole 26 is provided at the center of the recording for receiving the spindle/hub 14. An index hole 27 provides an index reference to assure that the record content is in the same relative angular position to the read/write head 16 from disk to disk. A narrowed data track 28 is located at the inside radius on the recording 12 for the most stringent signal-to-noise test. A data track 30 of predetermined normal width and a pair of adjacent interference tracks 29 and 31 form a test band 32 for checking alignment of the read/write head 16 by direct operation of the computer system 10. Preferably, the test band is located at the center of the recording. Both data tracks 28 and 30 comprise a continuous string of sectors, and each sector contains a group of bytes comprising one record of data. Numerous concentric circular tracks can be provided on the recording surface.

With reference to FIG. 3, there is shown the narrowed data track 28 with a reduced signal output that is used for checking the signal-to-noise quality of the computer system 10. T represents the width of written data recorded by a recording head. D represents a normal track space width, which is also the distance between centerlines of adjacent tracks or the reciprocal of the number of tracks per inch. D/6 represents a space width equivalent to off-track error resulting from a common accepted value for design tolerance within the computer system 10. The narrowed data track is formed by recording data in any known format readable by the system over a normal track width T that is centered within the normal track space width D, and erasing portions T/4 along each side of the normal recorded track. This leaves a track of one-half the normal width, centered in the normal track space. A pair of adjacent spaces 34 and 36 remain within the normal track space and extend parallel to the track on opposite sides thereof. These adjacent void spaces have equal widths that equal the sum of T/4 and D/6.

Referring now to FIG. 4, there is shown the test band 32 for checking alignment of the read/write head 16 by direct operation of the computer system 10. The data track 30 has a normal track width T or $\frac{2}{3}$D that is centered within the normal track space width D. Encoded data is recorded thereon in machine-readable format, such as one of the standard sector codes of IBM Corporation, at a basic data recording frequency (F). A pair of adjacent spaces 38 and 40 having widths approximately D/6 remain within the normal track space and extend parallel to the track 30 on opposite sides thereof. The width of these spaces is determined from the computer system off-track design tolerance. Such tolerance occurs due to factors such as screw runout, eccentricity in the spindle mount, and disk expansion and contraction. The common accepted value for off-track design tolerance is D/6. The pair of adjacent interference tracks 29 and 31 have magnetic interference signals recorded thereon. These interference signals are continuous waves having a frequency (2F) that is twice the basic data recording frequency (F) of data track 30, to form noise walls on each side of the data track.

In operation, a user inserts the recording 12 into the computer system 10 and directs the system to read the narrowed data track 28. Since the signal amplitude for this track is reduced, the signal-to-noise relationship is more sensitive to internal noise within the system. The read/write head 16 having a width equal to the track width T picks up the same signal amplitude for up to a T/4 off-track location in either direction from the track centerline, and the signal-to-noise test would not be affected by such an off-track condition. If the computer cannot read the narrowed data track, the problem is internal noise within the system. If the computer system reads the narrowed data track without error, the signal-to-noise quality of the system is satisfactory, and the user proceeds to the next test.

The user directs the computer system 10 to read data track 30 within test band 32 for checking head alignment by direct computer operation. FIG. 5 indicates the signal loss as head 16 moves from a track centerline position, indicated as 0% D, to an off-track condition, indicated as % D. If the head is off-track by a dimension equal to D/6, the width of adjacent spaces 38 and 40, then the % D is 16.7 and the signal loss is 3.47 dB. The slight signal loss has little affect upon the ability of the computer system to read the data track 30, because most drives will produce acceptable error performance as long as the recovered signal-to-noise ratio exceeds twenty dB. With the typical noise floor for drive electronics and disk noise at least thirty dB below the operating signal level, the twenty dB signal-to-noise point will not be reached until the recovered signal has been reduced by ten dB.

As the head 16 moves over an interference track 29 or 31, an interference signal is picked up in accordance with the graph if FIG. 6. In this graph, when the head is centered within the track space D for data track 30, the off-track is 0% D. As the head moves into an adjacent track space, the % D increases. When the interference amplitude increases with off-track position to a value of approximately twenty dB below data signal amplitude, the system will no longer achieve error free reading of the data track. In this case, the interference amplitude is about ten percent of the data signal amplitude. From this point, there is a rapid increase in the error rate with further off-track position, as can be seen by the graph of FIG. 7, wherein the error rate changes from better than one error in $0.5 \times 10^6$ bits to one error in $10^3$ bits in less than 1.3% D. This straight line slope has high sensitivity.

The signal-to-noise ratio versus off-track location graph of FIG. 8 shows a change from 26 dB below data signal at a location 2.5% D off-track to 21 dB at 4.8% D off-track. All systems tested achieved significant error counts between 18 dB S/N and 22 db S/N. This total range a sensitivity is achieved with a position variation between 4.4 to 6.3% D off-track. The average failure point for first error detection (one error per sector in at least six sectors per track) is 21 dB corresponding to 4.8% D off-track.

With reference to the composition performance graph of FIG. 9, accepted limits for the various parameters are shown. If the assumption is made that twenty dB signal-to-noise ratio is the value giving first errors, then the diagnostic test band 32 can be used to detect misalignments of 4.8% D off-track or a lesser percent. The error rate curve can be seen to support this contention as it moves from an error rate of one error in $0.5 \times 10^6$ bits to one error in $10^3$ bits in about 1.25% D off-track differential.

If the computer system 10 reads the data track 30 within the test band 32 without errors, the head alignment is within the tolerance set for that system. If the diagnostic testing resulted from the system being unable to read data recorded by another computer system, then that interchanged data should be checked to see if it was recorded by a computer system compatible with computer system 10. If errors occur when computer system 10 reads data track 30, the system indicates that the read/write head 16 is not within the off-track alignment required. Service is then required to align the drive.

In a modified form of the invention, FIG. 2 shows portions of a concentric track 28a and several tracks 30a–30f. These tracks can be on the same recording 12 to allow assessment of varying degrees of signal-to-noise quality or off-track alignment. Some of such tracks would be similar to the narrowed data track 28 with the track widths varied to change the signal output of the track for a quantified assessment of the failure signal-to-noise error. Other tracks would be similar to track 30 in test band 32, but the adjacent spacings 38 and 40 would be varied to change the off-track alignment tolerance for the various hands. By determining the minimum off-track alignment test band that the computer system 10 can read. The alignment error can be quantified.

Other evaluations can be made on the same recording 12. If some sectors of the data track 30 show errors while other sectors at angularly separated locations do not, when the possibilities of an eccentric recording spindle/hub 14 and off-center clamping action of the collet assembly should be investigated.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

We claim:

1. A diagnostic magnetic record media for loading into a computer drive and readable by a computer system for enabling a user of the system to diagnose the signal-to-noise quality and the head location alignment of the system relative to predetermined acceptable limits, comprising:

a first data track having a magnetic test data signal recorded thereon of a predetermined amplitude and in a format readable by a computer system and of a frequency F, wherein F is a predetermined basic data recording frequency, the first data track being of width T wherein T is the width of written data recorded by a recording head;

a pair of spaces located on opposite sides of and in abutment with each edge of the first data track, each of said spaces being of a width of approximately D/6 wherein D is the distance between center lines of adjacent data tracks, whereby the spaces have a width of a value to allow for design tolerance within the computer system and resulting in acceptable off-track operation range;

a pair of interference tracks with each interference track located in abutment with one of the spaces, each of the interference tracks being recorded with a continuous wave magnetic interference signal recorded thereon of a frequency different from the frequency F whereby a noise wall is established on each side of the first data track; and a narrowed data track of a width less than T and having recorded thereon a magnetic signal having an amplitude less than the amplitude of data recorded on the first data track whereby the signal-to-noise level of the computer system may be diagnosed relative to a predetermined reference level.

2. The diagnostic record of claim 1 wherein said record is a magnetic disk, the first data track is located near mid-radius porrtion of the disk and the narrowed data track is the innermost track on the disk for the most stringent signal-to-noise test.

3. The diagnostic record of claim 1 wherein the narrowed data track has a width reduced from the width T with the amount of reduction being proportional to the reduction of magnetic signal amplitude of the narrowed data track to the predetermined magnetic signal amplitude of the first data track.

4. The diagnostic record of claim 1 wherein the narrowed data track has a width that is approximately T/2.

5. The diagnostic record of claim 1 wherein the narrowed data track has a magnetic signal amplitude that is approximately one-half the predetermined magnetic signal amplitude of the data track.

6. The diagnostic record of claim 1 further including a plurality of narrowed data tracks, each narrowed data track recorded with a signal having a different magnetic signal amplitude, whereby the signal-to-noise quality for the computer system can be determined by the narrowed data track that can be read nearest to the narrowed data track that can not be read.

7. The diagnostic record of claim 1 further including a plurality of first data tracks having the same predetermined magnetic signal amplitude, a plurality of spaces with one space located adjacent each side of each first data track, and a plurality of interference tracks having continuous magnetic interference signals recorded thereon with each interference track located at an edge of a space opposite from one of the first data track edges, each pair of spaces on opposite sides of the same first data track having the same space width but at least some pairs of spaces adjacent the first data tracks having different space widths representing different design tolerances to determine quantitatively the off-track error head alignment for the computer system.

8. The diagnostic record of claim 1 further including a plurality of narrowed data tracks, each narrowed data track being recorded with a signal of a different magnetic amplitude, whereby the signal-to-noise quality for the computer system and the off-track error head alignment can be determined quantitatively.

9. The diagnostic record of claim 1 wherein the magnetic interference signals on the interference tracks spaced on opposite sides of the first data track are recorded with a signal at the highest of the fundamental frequencies recorded on the first data track.

10. A diagnostic record of claim 1 wherein the first data track width is about ⅔D and the width of adjacent spaces is less than about D/6.

11. The method of testing a recording system having a recording media and a recording head supported adjacent thereto such that with relative movement therebetween and energization of the head, tracks of data of a predetermined signal amplitude and track width can be recorded on and read back from the media, said method comprising:
forming on the media a first test track by recording a first signal having a track width less than said predetermined track width,
forming on the media a second test track by recording a second signal of known content and having nearby on at least one side an interference track comprising an interference signal of known signal amplitude,
causing relative movement between said recording head and media,
positioning the recording head over said narrowed first test track, reading the first signal and sensing errors to determine whether the signal to noise ratio of the recording system is sufficient to read said signals,
positioning the recording head over said second test track and reading said data track and detecting the amplitude of any interference signal read as evidenced by data errors read to determine the recording head alignment relative to said data track.

12. The method as defined in claim 11 including the step of recording an interference signal on both sides of said second signal test track.

13. The method as defined in claim 11 including the step of forming said first test track with a width not exceeding one-half of said predetermined track width.

14. The method as defined in claim 11 including the step of forming said second test track with said interference track having a frequency that is a whole number multiple of the frequency of said adjacent test track.

15. The method as defined in claim 12 wherein said interference tracks are recorded with a signal frequency of twice the signal frequency of said included test track.

16. The method as defined in claim 11 wherein said first test track is formed in sectors.

17. The method as defined in claim 11 wherein said second test track is formed in sectors.

18. A diagnostic record media for testing a recording system comprising a recording head moveable over a record media for recording and reading back a data signal resulting from the interaction of the recording head and media with energization of the recording head to record a data track on the media having a width T and a predetermined signal amplitude, said diagnostic record media comprising:
a first data signal track having a width substantially less than the width T,
a second data signal track having a signal amplitude near that predetermined signal amplitude and having a width less than the width T,
an interference track positioned near said second data track and having a known interference signal content whereby the recording head is positioned over said first data track and the first data signal read to determine whether the signal to noise ratio is acceptable and the recording head is positioned over said second data track and said interference signal is detected to indicate the head alignment.

19. The method of testing a recording system having a recording media and a recording head supported adjacent thereto such that with relative movement therebetween and energization of the recording head, tracks of data of a predetermined signal amplitude and track which can be recorded on and read back from a media, said method comprising:
moving the head over a media on which there is recorded a first data track formed by recording a first test signal having a signal amplitude less than said predetermined signal amplitude and a track width less than said predetermined track width to determine if the recording head can detect a low signal to noise ratio signal,
moving the head over a media in which there is recorded a second data track formed by recording a second test signal having a track width less than said predetermined signal track width with an interference signal recorded immediately near one side of said second data track and detecting the strength of said interference signal detected to determine the alignment of said recording head relative to said second data track.

20. A diagnostic magnetic record media for loading into a computer drive and readable by a computer system for enabling a user of the system to diagnose the signal-to-noise quality and the head location alignment of the system relative to predetermined acceptable limits, comprising:
a first data track having a magnetic test data signal recorded thereon of a predetermined amplitude and in a format readable by a computer system and of a frequency F, wherein F is a predetermined basic data recording frequency, the first data track being of a width T wherein T is the width of written data recorded by a recording head;
a space having a width of 0 to approximately D/6 located on one side of, and in abutment with one edge of the first data track, wherein D is the distance between center lines of adjacent data tracks, whereby the space has a width of a value to allow for design tolerance within the computer system and resulting in acceptable off-track operation range;
an interference track located closely adjacent one side of the space, said interference track being recorded with a continuous wave magnetic interference signal recorded thereon of a frequency different from the frequency F whereby a noise wall is established on one side of the first data track; and
a second data track narrowed to a width within the range less than T and having recorded thereon a magnetic signal having an amplitude less than the amplitude of data recorded on the first data track whereby the signal-to-noise level of the computer system may be diagnosed relative to a predetermined reference level by reading said second data track and the alignment of the system can be determined by reading said first data track.

21. The diagnostic record of claim 20 wherein said record is a magnetic disk, the first data track is located near mid-radius portion of the disk and the narrowed data track is the innermost track on the disk for the most stringent signal-to-noise test.

22. The diagnostic record of claim 20 wherein the narrowed second data track has a width that is approximatley T/2.

23. The diagnostic record of claim 20 wherein the narrowed second data track has a magnetic signal amplitude that is approximately one-half the predetermined magnetic signal amplitude of the first data track.

24. The method of testing the signal-to-noise quality of a recording system having a recording media and a recording head supported adjacent thereto such that with relative movement therebetween and energization of the head, tracks of data of a predetermined signal amplitude responsive to the level of energization can be recorded on and read back from the media, said method comprising:

forming on the media a first data track by recording a first signal having a track width less than said predetermined track width;
   causing said recording head to read said first data track and comparing the resulting read back signal with said first signal to determine if the signal to noise quality of said system is sufficient to detect said reduced amplitude signal.

25. The method as defined in claim 24, including the step of forming several first data tracks on said media by recording signals of different amplitudes and reading back said data tracks to determine the signal-to-noise quality of said system.

26. The method of testing the alignment of a recording system having a recording media and a recording head supported adjacent thereto such that with relative movement therebetween and energization of the head, tracks of data of a predetermined signal amplitude and width can be recorded on and read back from the media, said method comprising:

forming on the media a data track having a width less than said predetermined width;
   forming near the data track on the media an interference track by recording data that is distinguishable from said data track;
   causing the recording head to traverse and read back said data track to determine the amplitude of interference encountered by also detecting said interference track thereby to determine the alignment of the recording head with said data track.

27. The method as defined in claim 26, including the step of forming on both sides of said data track an interference track.

28. The method as defined in claim 26, including the step of forming a plurality of data tracks on said media and including the step of forming the interference tracks at different distances from the associated data tracks to render a qualitative analysis of the alignment of the recording head relative to the data tracks.

* * * * *